US012008487B2

(12) United States Patent
Cao et al.

(10) Patent No.: US 12,008,487 B2
(45) Date of Patent: Jun. 11, 2024

(54) INFERENCE MODEL OPTIMIZATION

(71) Applicant: International Business Machines Corporation, Armonk, NY (US)

(72) Inventors: Li Cao, Beijing (CN); Ze Ming Zhao, Beijing (CN); Hong Min, Hopewell Junction, NY (US); Jing Yan Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 17/122,774

(22) Filed: Dec. 15, 2020

(65) Prior Publication Data

US 2022/0188676 A1 Jun. 16, 2022

(51) Int. Cl.
G06F 3/048 (2013.01)
G06F 16/54 (2019.01)
G06N 5/048 (2023.01)
G06F 3/01 (2006.01)

(52) U.S. Cl.
CPC ............. G06N 5/048 (2013.01); G06F 16/54 (2019.01)

(58) Field of Classification Search
CPC ................................. G06N 5/048; G06F 16/54
See application file for complete search history.

(56) References Cited

U.S. PATENT DOCUMENTS

| | | | | |
|---|---|---|---|---|
| 6,252,588 B1* | 6/2001 | Dawson | .................. | G06F 9/451 715/752 |
| 6,583,799 B1* | 6/2003 | Manolis | .................. | G06F 16/50 715/838 |
| 6,629,104 B1* | 9/2003 | Parulski | .................. | G06F 16/58 707/999.102 |
| 6,636,259 B1* | 10/2003 | Anderson | .......... | H04N 1/00241 348/211.3 |
| 6,700,591 B1* | 3/2004 | Sharpe | ................ | G06F 3/04897 715/762 |
| 6,715,003 B1* | 3/2004 | Safai | .................. | H04N 1/00413 348/211.3 |
| 6,771,801 B1* | 8/2004 | Fisher | ..................... | G06T 11/60 283/67 |
| 6,914,694 B1* | 7/2005 | Ichikawa | ........... | H04N 1/32776 358/1.15 |
| 6,950,198 B1* | 9/2005 | Berarducci | ........ | G06Q 30/0601 705/26.1 |
| 7,027,172 B1* | 4/2006 | Parulski | ............. | H04N 1/00482 358/1.15 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Nicholas Augustine

(74) *Attorney, Agent, or Firm* — Gilbert Harmon, Jr.

(57) ABSTRACT

An approach to optimize performance for large scale inference models. Data in the form of images is received from sensors such as cameras. The data is processed to generate data tags associated with the context of the image and portion the images. Model tags are generated based on data characteristics or user input. The tags and their associated data are added to a time-based queue for delivery to the appropriate inference models. Based on the embedded delivery time and frequency, the portioned images are delivered to the appropriate inference models.

20 Claims, 5 Drawing Sheets

(56) References Cited

U.S. PATENT DOCUMENTS

| | | | | |
|---|---|---|---|---|
| 7,089,286 B1* | 8/2006 | Malik | H04L 51/066 | |
| | | | 709/217 | |
| 7,117,519 B1* | 10/2006 | Anderson | H04N 1/00413 | |
| | | | 348/14.1 | |
| 7,212,731 B1* | 5/2007 | Morotomi | H04N 23/531 | |
| | | | 386/323 | |
| 7,243,079 B1* | 7/2007 | Manolis | G06Q 30/0635 | |
| | | | 705/26.81 | |
| 7,287,088 B1* | 10/2007 | Anderson | H04L 67/5651 | |
| | | | 709/230 | |
| 7,350,236 B1* | 3/2008 | Silverbrook | B43K 7/02 | |
| | | | 715/709 | |
| 7,668,913 B1* | 2/2010 | Underwood | G06Q 30/0601 | |
| | | | 715/236 | |
| 7,734,724 B2* | 6/2010 | Rezvani | H04L 67/02 | |
| | | | 709/224 | |
| 8,099,502 B2* | 1/2012 | Genske | G06F 9/4411 | |
| | | | 709/227 | |
| 8,224,776 B1* | 7/2012 | Anderson | H04L 63/0876 | |
| | | | 709/250 | |
| 9,317,574 B1* | 4/2016 | Brisebois | G06F 16/951 | |
| 10,579,902 B2 | 3/2020 | Lim | | |
| 2002/0016818 A1* | 2/2002 | Kirani | H04L 51/08 | |
| | | | 709/217 | |
| 2002/0023101 A1* | 2/2002 | Kurihara | G06F 16/40 | |
| | | | 707/999.102 | |
| 2002/0167538 A1* | 11/2002 | Bhetanabhotla | G06F 16/532 | |
| | | | 707/E17.03 | |
| 2002/0198936 A1* | 12/2002 | McIntyre | H04L 69/329 | |
| | | | 709/206 | |
| 2002/0199208 A1* | 12/2002 | Chang | H04N 21/8153 | |
| | | | 348/E7.071 | |
| 2004/0066403 A1* | 4/2004 | Nagata | H04N 1/00477 | |
| | | | 715/748 | |
| 2004/0100508 A1* | 5/2004 | Hansson | H04N 1/00355 | |
| | | | 715/863 | |
| 2009/0006285 A1* | 1/2009 | Meek | G06Q 10/10 | |
| | | | 707/999.1 | |
| 2010/0082751 A1* | 4/2010 | Meijer | G06F 15/16 | |
| | | | 709/206 | |
| 2011/0320454 A1* | 12/2011 | Hill | G06V 10/765 | |
| | | | 707/E17.046 | |
| 2017/0242886 A1* | 8/2017 | Jolley | G06F 40/232 | |
| 2017/0329413 A1* | 11/2017 | Kramer | G06F 3/0425 | |
| 2018/0336226 A1* | 11/2018 | Anorga | G06V 20/35 | |
| 2018/0336415 A1* | 11/2018 | Anorga | G06F 18/24 | |
| 2018/0349484 A1* | 12/2018 | Carlisle | G06F 16/9535 | |
| 2019/0035241 A1* | 1/2019 | Laska | H04N 7/181 | |
| 2019/0042955 A1 | 2/2019 | Cahill | | |
| 2019/0138908 A1 | 5/2019 | Bernat | | |
| 2019/0303698 A1 | 10/2019 | Hwangbo | | |
| 2020/0120097 A1* | 4/2020 | Amitay | G06F 3/04842 | |
| 2021/0209488 A1* | 7/2021 | Li | G06N 3/063 | |
| 2022/0045913 A1* | 2/2022 | Wang | G06N 20/00 | |

* cited by examiner

INFERENCE MODEL OPTIMIZATION

TECHNICAL FIELD

The present invention relates generally to machine learning, and more specifically, to optimizing machine learning inference model performance for large datasets and/or complex scenarios.

BACKGROUND

Artificial Intelligence (AI) model inference is widely used in many scenarios. However, if the dataset is large and/or the inference model scenario is complex, the performance of the inference model may degrade to the point where the value of AI becomes questionable. For example, an image processing AI system in a public area, such as an airport can involve greater than two thousand image capturing devices and hundreds of inference models requiring real time performance.

Based on current practices of full connection between available sensors and available inference models, performance barriers are created based data distribution and data processing wherein all of the sensor data is transmitted to all of the inference models. Currently, it is difficult to determine sensor data applicability for a particular inference model based on sensor positioning. Further, a particular inference model is trained for a particular purpose and the data from a particular sensor may not be meaningful to the particular inference model.

BRIEF SUMMARY

According to an embodiment of the present invention, a computer-implemented method for optimizing data delivery to inference models, the computer-implemented method comprising: receiving, by one or more processors, data from one or more sensors; processing, by the one or more processors, the data and generating one or more data tags based on characteristics associated with the data and one or more model tags; adding, by the one or more processors, the one or more data tags and the one or more model tags to a time-based tag queue; and transmitting, by the one or more processors, a portion of the one or more data tags and the data associated with the portion of the one or more data tags to an inference model identified by a model tag associated with the portion of the one or more data tags.

According to an embodiment of the present invention, a computer program product for improving the quality of a presentation, the computer program product comprising: one or more non-transitory computer readable storage media and program instructions stored on the one or more non-transitory computer readable storage media, the program instructions comprising: program instructions to receive data from one or more sensors; program instructions to process the data and generating one or more data tags based on characteristics associated with the data and one or more model tags; program instructions to add the one or more data tags and the one or more model tags to a time-based tag queue; and program instructions to transmit a portion of the one or more data tags and the data associated with the portion of the one or more data tags to an inference model identified by a model tag associated with the portion of the one or more data tags.

According to an embodiment of the present invention, a computer system for improving the quality of a presentation, the computer system comprising: one or more computer processors; one or more computer readable storage media; and program instructions stored on the one or more computer readable storage media for execution by at least one of the one or more processors, the program instructions comprising: program instructions to receive data from one or more sensors; program instructions to process the data and generating one or more data tags based on characteristics associated with the data and one or more model tags; program instructions to add the one or more data tags and the one or more model tags to a time-based tag queue; and program instructions to transmit a portion of the one or more data tags and the data associated with the portion of the one or more data tags to an inference model identified by a model tag associated with the portion of the one or more data tags.

Other aspects and embodiments of the present invention will become apparent from the following detailed description, which, when taken in conjunction with the drawings, illustrate by way of example the principles of the invention.

DETAILED DESCRIPTION

Figure 1:
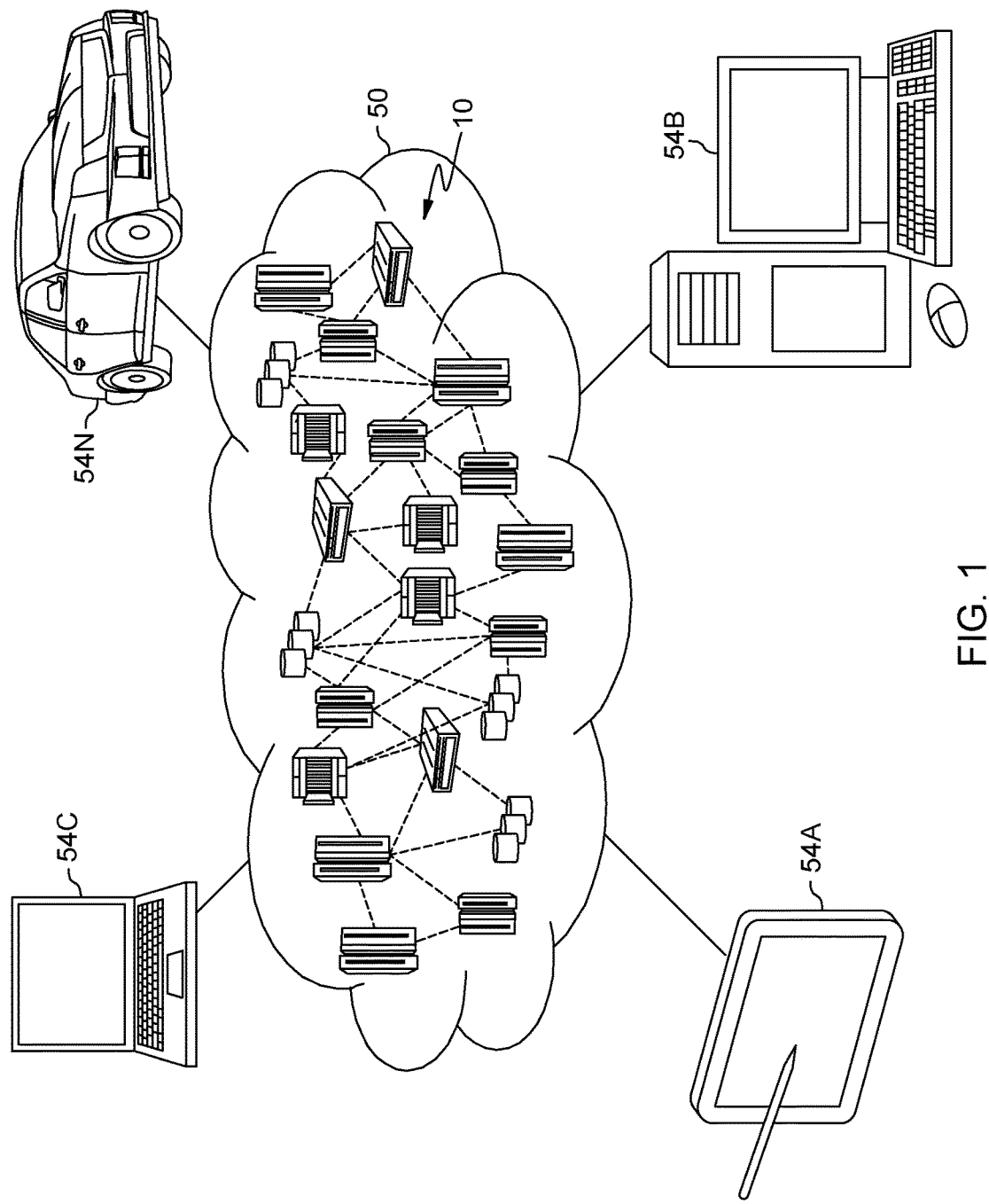
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of performance enhancement for large scale inference models. It should be noted that the term software, as used herein, includes any type of computer instructions such as, but not limited to, firmware, microcode, etc.

In one general embodiment, a computer-implemented method includes receiving, by one or more processors, data from one or more sensors; processing, by the one or more processors, the data and generating one or more data tags based on characteristics associated with the data and one or more model tags; adding, by the one or more processors, the one or more data tags and the one or more model tags to a time-based tag queue; and transmitting, by the one or more processors, a portion of the one or more data tags and the data associated with the portion of the one or more data tags to an inference model identified by a model tag associated with the portion of the one or more data tags.

In another general embodiment, a system includes a processor and logic integrated with the processor, executable by the processor, or integrated with and executable by the processor. The logic is configured to perform the foregoing computer-implemented method.

In another general embodiment, a computer program product for install-time software validation includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
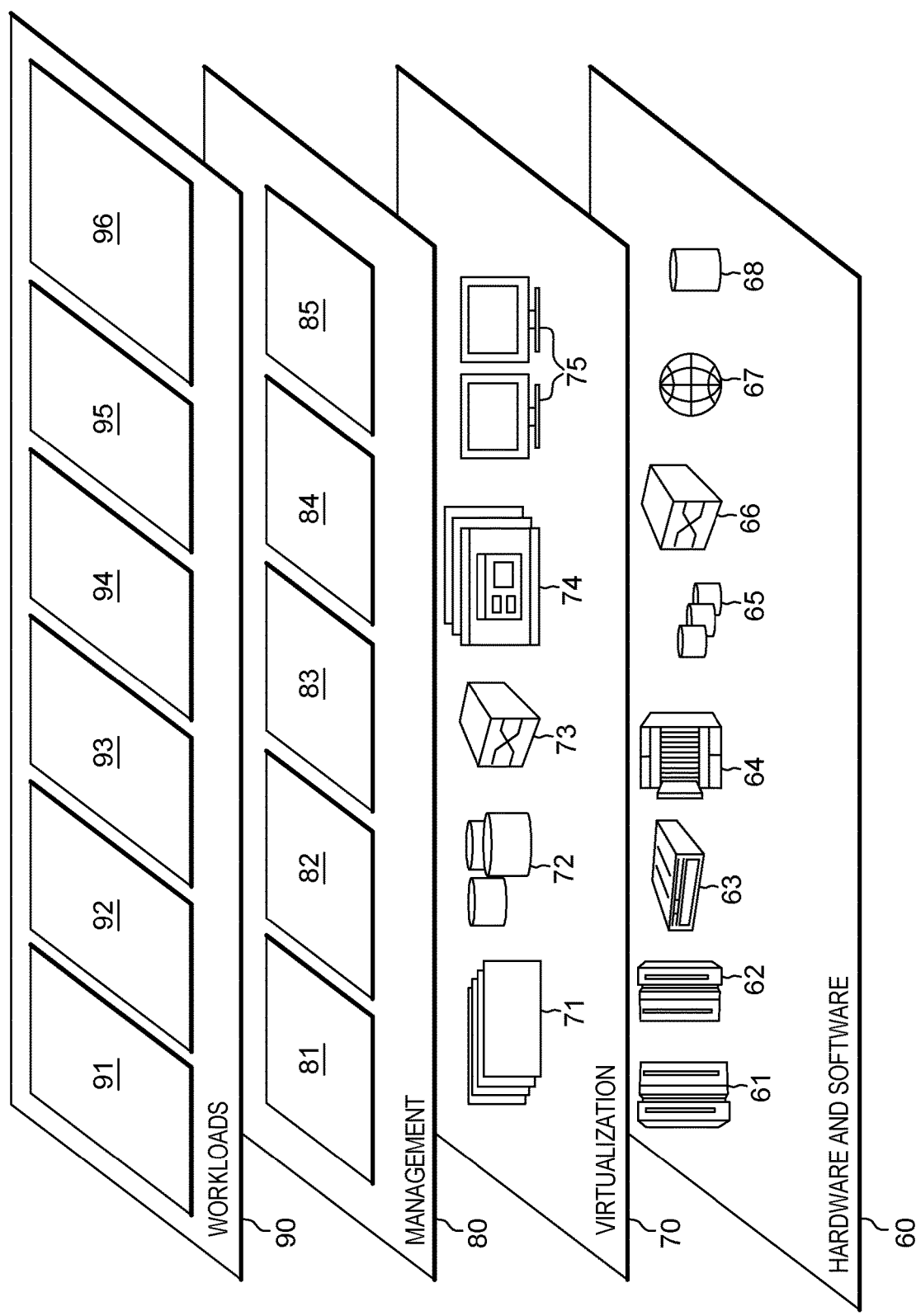
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and inference model sensor data dispatching 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
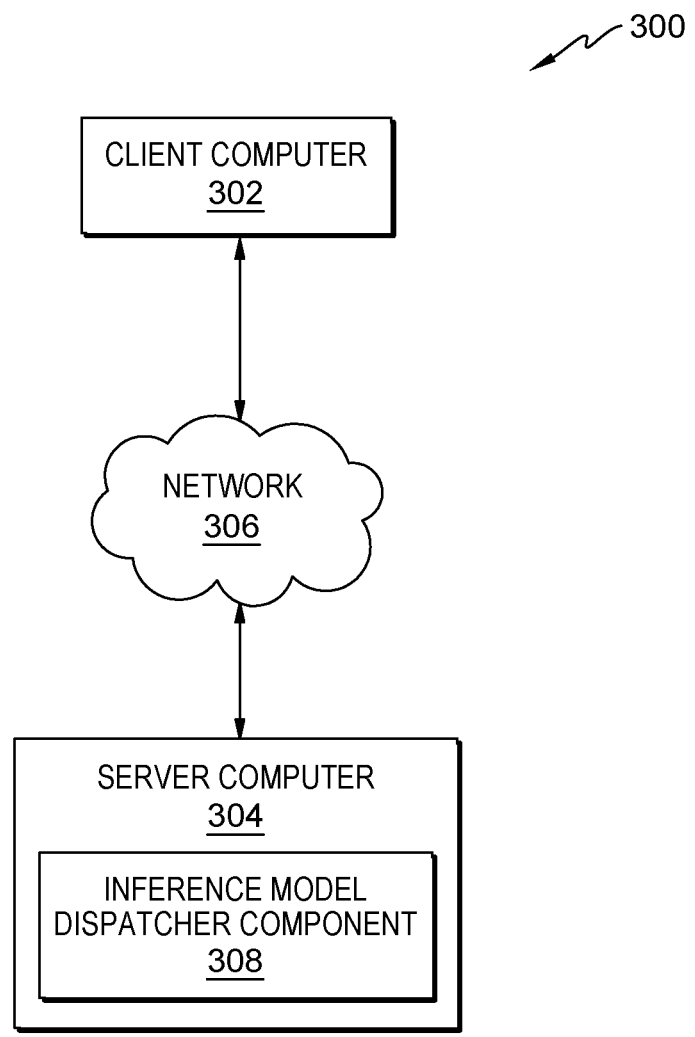
FIG. 3 is a high-level architecture, according to embodiments of the present invention.
Figure 4:
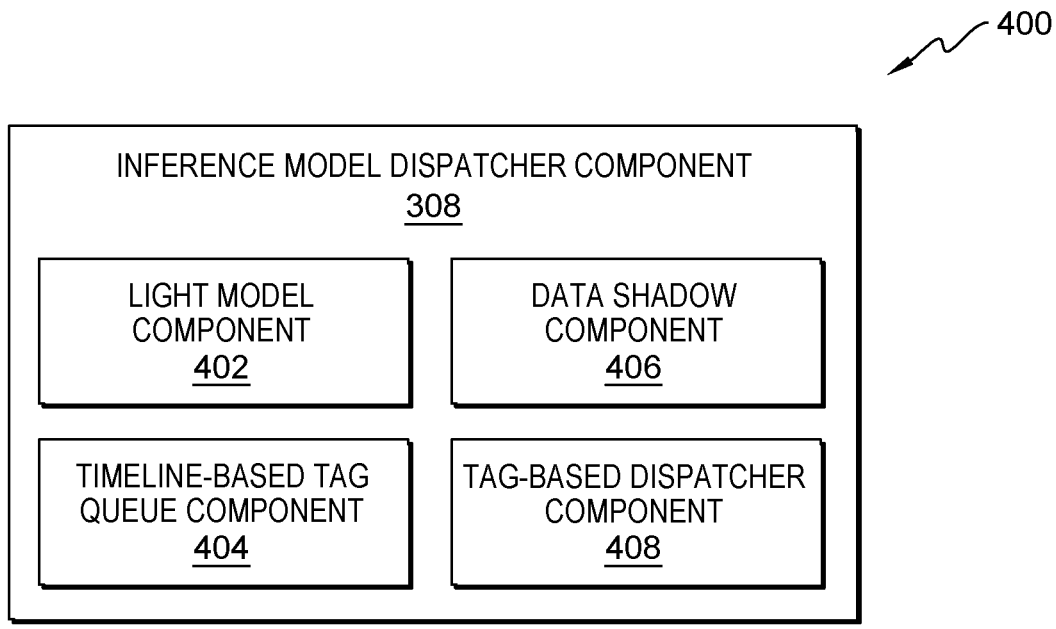
FIG. 4 is an exemplary detailed architecture, according to embodiments of the present invention.
Figure 5:
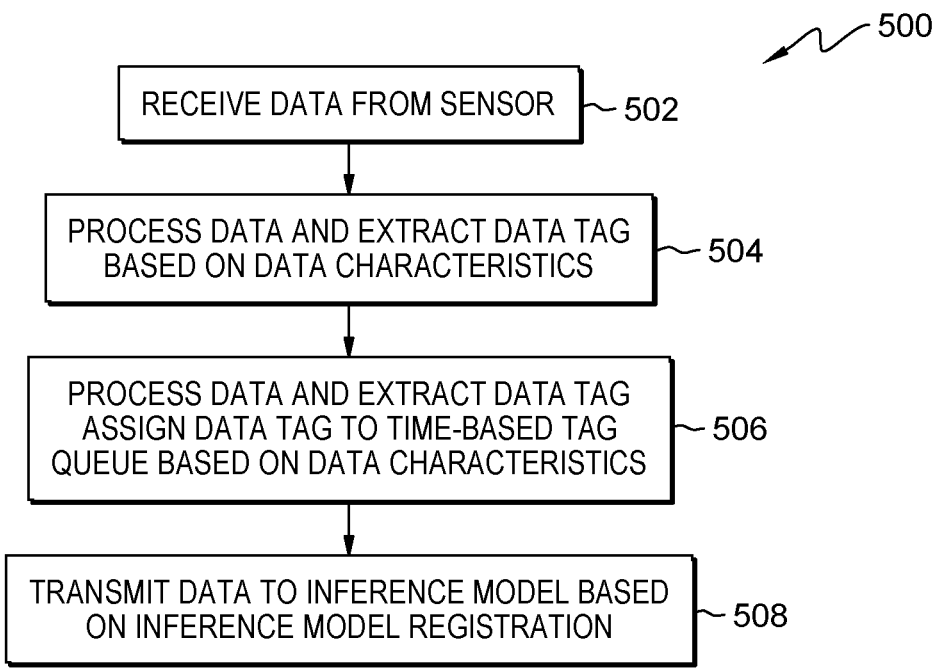
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram showing an exemplary processing system for an inference model sensor data dispatching environment to which the invention principles may be applied. The architecture 300 comprises a client computer 302, an inference model dispatcher component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Inference model dispatcher component 308, operational on client computer 302, interacts with a plurality of sensors and a plurality of inference models to enhance performance based on providing appropriate portions of sensor data associated with the plurality of sensors to inference models suitable to process the respective portions of the sensor data. Inference model dispatcher component 308 can receive a registration request from a particular inference model and maintain a tag-based queue of inference models and the sensor data of interest to the particular inference model. Further, inference model dispatcher component 308 can dispatch received data, suitable for an appropriate registered inference model to the registered inference model based on an update schedule provided in the registration.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise an inference model dispatcher component 308, which can further comprise a light model component 402, a timeline-based tag queue component 404, a data shadow component 406 and a tag-based dispatcher component 408.

The light model component 402 can use an intermediate deep network model, sacrificing some accuracy for faster performance, that identifies a basic scenario and basic features providing a threshold for tag tracking. The light model component 402 can provide data tag generation from received data, e.g., image data. The light model component 402 can identify basic features, e.g., a named tag of an image, from an image obtained from a sensor, e.g., a camera. The light model component 402 can also crop an image and/or key zones of an image for association with a tag. The light model component 402 can provide image decoupling based on a thermodynamic diagram and/or a depth of field. In another aspect, the light model component 402 can generate tags identifying the inference model required for the associated image. It should be noted that the required inference model can be predefined by the user. Further, increased efficiency is obtained by the light model component 402 based on cropping images to direct portions of a larger image to a particular inference model that only is concerned with the cropped portion of the image. In other words, data, e.g., an image, can be divided into component pieces and distributed to inference models based on the component piece the inference model desires. It should be noted that images from medical devices, e.g., medical diagnosis images can be processed by the herein described embodiments.

The timeline-based tag queue component 404 provides an ordered collection of image tags and inference model tags. Tags can represent uses cases, scenarios or images, e.g., a face, an object, an alert, a high-density representation, a trajectory, etc. Image tags describe a scenario associated with an image or key features depicted in an image. For example, an image of a group of people smiling can have an image tag of "smiling people," characteristics of images and tags can further comprise one or more people, faces of the one or more people, emotions associated with the faces, geographical location associated with an image, animals associated with an image, inanimate objects and medical abnormalities. It should be noted that an image tag can be generated by the light model component 402 or inferred by the timeline-based tag queue component 404 based on the ordered arrangement of tags. Model tags maintain model shadow info, i.e., tags required by a particular model. Although inference model tag association can be predefined by a user, it can also be inferred or predicted by the timeline-based tag queue component 404.

The timeline-based tag queue component 404 can calculate time windows for grouping image tags for delivery to inference models. It should be noted that one or more model tags can be included in the calculated time windows to identify inference models for delivery of time window payload of tags. In another aspect, the timeline-based tag queue component 404 can calculate a tag time of delivery of tags and their associated data (e.g., images) for a predetermined number of time windows based on a sum of the time window offsets in which the tag appears divided by the predetermined number of time windows considered. It should be noted that the image tag with the greatest tag time has the highest frequency of delivery.

The data shadow component 406 can provide the capability for a user to register a tag needed by a particular inference model. The tag-based dispatcher component 408 (described subsequently) can direct image tags and their associated data to the appropriate inference model as they arise on the timeline-based tag queue. It should be noted that the timeline-based tag queue can also infer and/or predict inference model associations based on the image context and nearby (time based) tags. The data shadow component 406 can provide an inference model identity and location information necessary for the tag-based dispatcher component 408 to send a tag and the tag's associated data to the inference model.

The tag-based dispatcher component 408 can parse the timeline-based tag queue component 404 to determine the tags that are ready to be sent to an inference model and the data shadow component 406 to the determine the inference models that are requesting the particular tags and route the appropriate tags and their associated data from the edge side to the appropriate central side inference model.

FIG. 5 is an exemplary flowchart of a method 500 for improving the performance of large-scale model inference. At step 502, an embodiment can receive data from a sensor, e.g., receive an image from a camera. At step 504, the data can be processed, via light model component 402, and a data tag and/or a model tag can be generated/extracted from the data based on characteristics of the data. At step 506, the data tags and model tags can be assigned, via timeline-based tag queue component 404, to the time-based tag queue based on the data characteristics. At step 508, the data tags can be sent to the appropriate inference models, via the tag-based dispatcher component 408, based on the data tags and the model tags ordered in the timeline-based tag queue.

Figure 6:
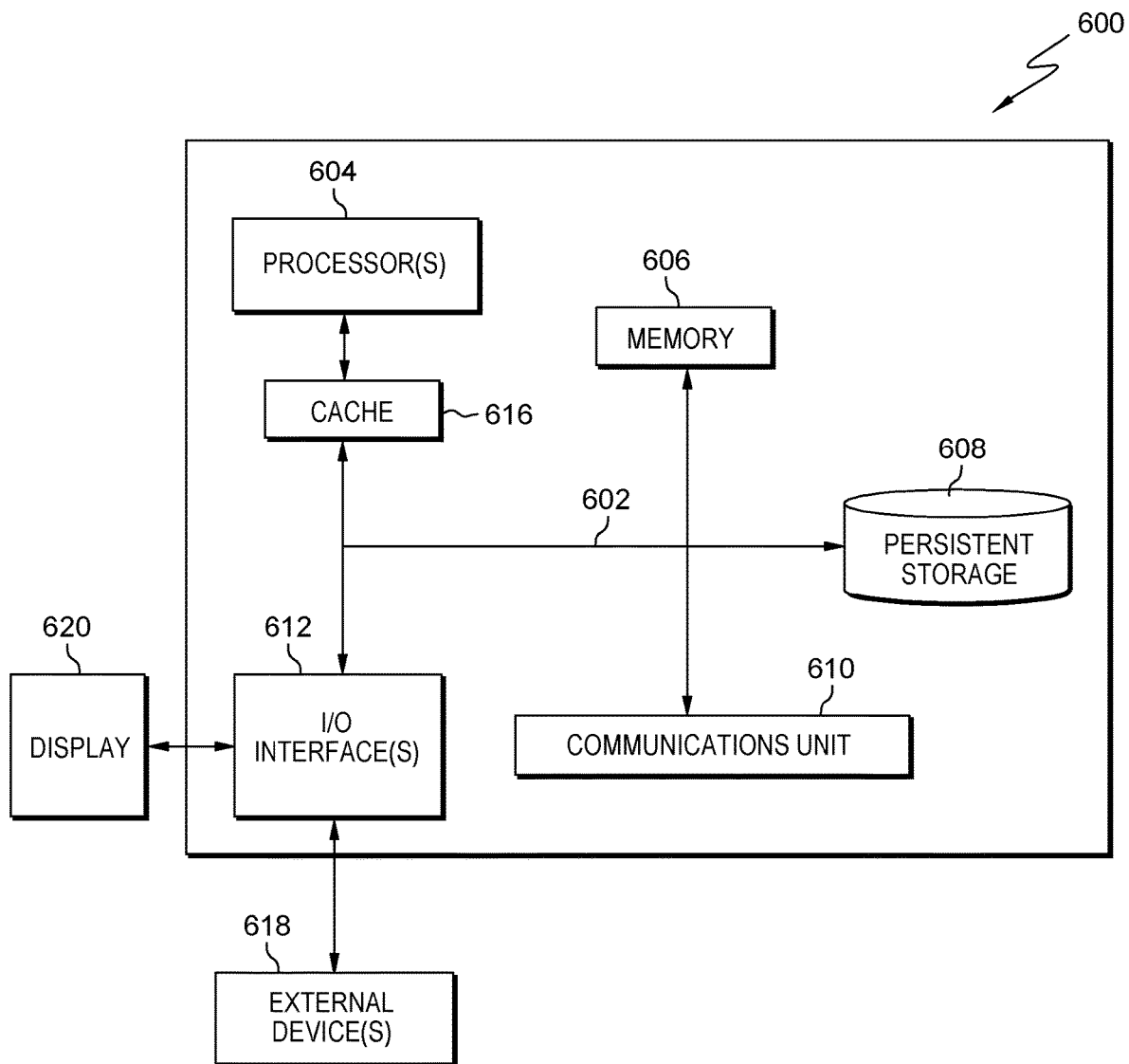
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing data delivery to inference models, the computer-implemented method comprising:

receiving, by one or more processors, data from one or more sensors;

processing, by the one or more processors, the data and generating one or more data tags based on characteristics associated with the data and one or more model tags;

adding, by the one or more processors, the one or more data tags and the one or more model tags to a time-based tag queue;

parsing, by the one or more processors, the time-based tag queue to identify at least one inference model associated with at least one of the one or more data tags; and transmitting, by the one or more processors, a portion of the at least one of the one or more data tags and the data associated with the portion of the at least one of the one or more data tags from an edge side to the identified at least one inference model.

2. The computer-implemented method of claim 1, wherein the data is images and the one or more sensors are cameras.

3. The computer-implemented method of claim 1, wherein the characteristics comprise people, number of people, faces of people, density of people, facial emotions, geographic locations, animals, inanimate objects, and medical abnormalities.

4. The computer-implemented method of claim 2, wherein the data tags are generated based on a context captured in the images.

5. The computer-implemented method of claim 1, wherein the one or more model tags are generated based on user input or based on a context associated with the data.

6. The computer-implemented method of claim 1, wherein the time-based tag queue is sorted on a delivery time and frequency of delivery basis.

7. The computer-implemented method of claim 6, wherein the delivery time and the frequency of delivery is calculated based on a sum of a number of time window offsets in which the one or more data tags appear, for a predetermined number of time windows, divided by the predetermined number of time windows.

8. A computer program product for improving quality of a presentation, the computer program product comprising:
one or more non-transitory computer readable storage media and program instructions stored on the one or more non-transitory computer readable storage media, the program instructions comprising:
program instructions to receive data from one or more sensors;
program instructions to process the data and generating one or more data tags based on characteristics associated with the data and one or more model tags;
program instructions to add the one or more data tags and the one or more model tags to a time-based tag queue;
program instructions to parse the time-based tag queue to identify at least one inference model associated with at least one of the one or more data tags; and
program instructions to transmit a portion of the at least one of the one or more data tags and the data associated with the portion of the at least one of the one or more data tags from an edge side to the identified at least one inference model.

9. The computer program product of claim 8, wherein the data is images and the one or more sensors are cameras.

10. The computer program product of claim 8, wherein the characteristics comprise people, number of people, faces of people, density of people, facial emotions, geographic locations, animals, inanimate objects and medical abnormalities.

11. The computer program product of claim 9, wherein the data tags are generated based on a context captured in the images.

12. The computer program product of claim 8, wherein the one or more model tags are generated based on user input or based on a context associated with the data.

13. The computer program product of claim 8, wherein the time-based tag queue is sorted on a delivery time and frequency of delivery basis.

14. The computer program product of claim 13, wherein the delivery time and the frequency of delivery is calculated based on a sum of a number of time window offsets in which the one or more data tags appear, for a predetermined number of time windows, divided by the predetermined number of time windows.

15. A computer system for improving quality of a presentation, the computer system comprising:
one or more computer processors;
one or more computer readable storage media; and
program instructions stored on the one or more computer readable storage media for execution by at least one of the one or more processors, the program instructions comprising:
program instructions to receive data from one or more sensors;
program instructions to process the data and generating one or more data tags based on characteristics associated with the data and one or more model tags;
program instructions to add the one or more data tags and the one or more model tags to a time-based tag queue;
program instructions to parse the time-based tag queue to identify at least one inference model associated with at least one of the one or more data tags; and
program instructions to transmit a portion of the at least one of the one or more data tags and the data associated with the portion of the at least one of the one or more data tags from an edge side to the identified at least one inference model.

16. The computer system of claim 15, wherein the data is images and the one or more sensors are cameras.

17. The computer system of claim 16, wherein the data tags are generated based on a context captured in the images.

18. The computer system of claim 15, wherein the one or more model tags are generated based on user input or based on a context associated with the data.

19. The computer system of claim 15, wherein the time-based tag queue is sorted on a delivery time and frequency of delivery basis.

20. The computer system of claim 19, wherein the delivery time and the frequency of delivery is calculated based on a sum of a number of time window offsets in which the one or more data tags appear, for a predetermined number of time windows, divided by the predetermined number of time windows.

* * * * *